Oct. 4, 1949.　　　R. A. SCHAFER　　　2,483,712
MACHINE TOOL

Filed May 4, 1945　　　　　　　　　　　　14 Sheets-Sheet 1

INVENTOR:
Robert A. Schafer
BY
Williams, Bradbury & Hinkle
Attorneys.

Oct. 4, 1949. R. A. SCHAFER 2,483,712
MACHINE TOOL
Filed May 4, 1945 14 Sheets-Sheet 2

INVENTOR:
Robert A. Schafer
BY
Williams, Bradbury & Hinkle
Attorneys.

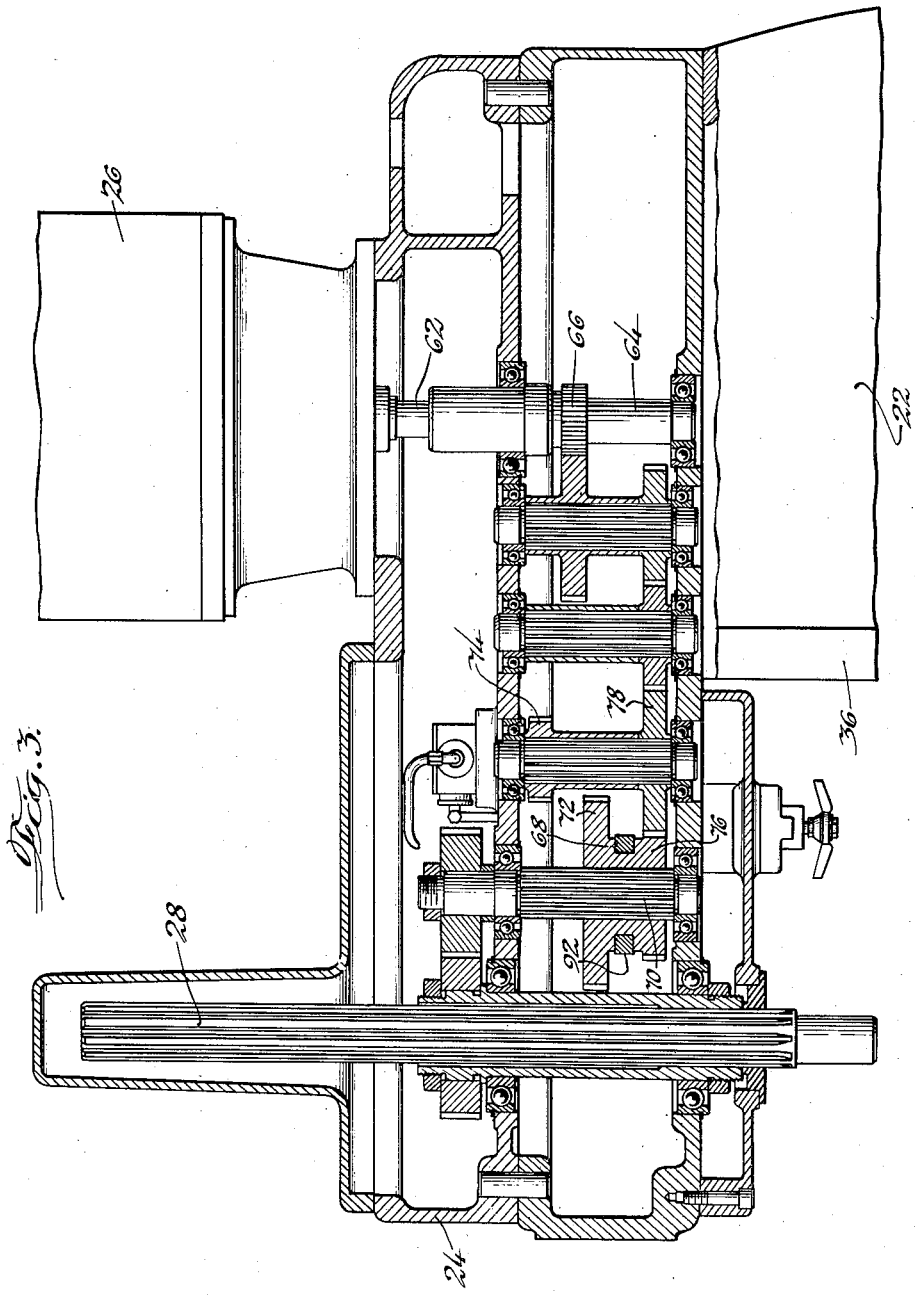

Oct. 4, 1949.　　　　　R. A. SCHAFER　　　　　2,483,712
MACHINE TOOL
Filed May 4, 1945　　　　　　　　　　　　　14 Sheets-Sheet 4
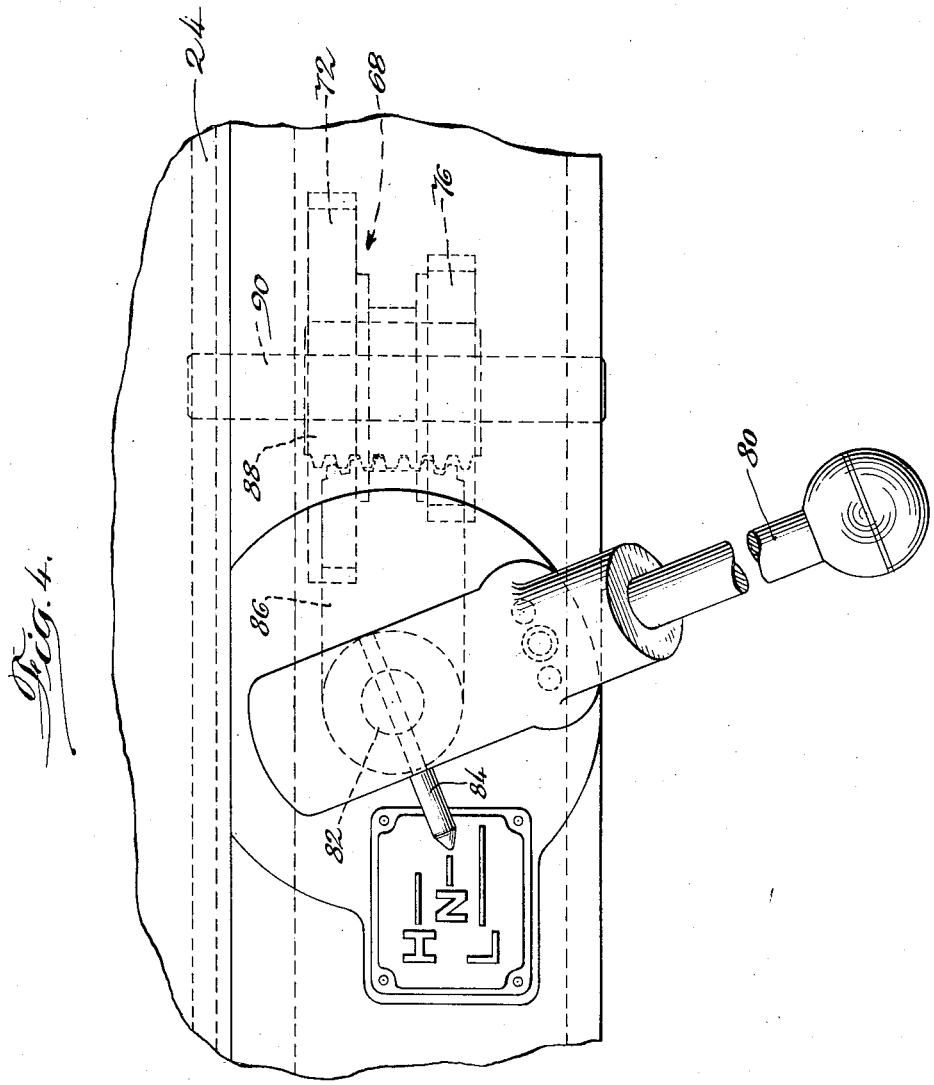
INVENTOR:
Robert A. Schafer
By Williams, Bradbury & Huck
Attorneys.

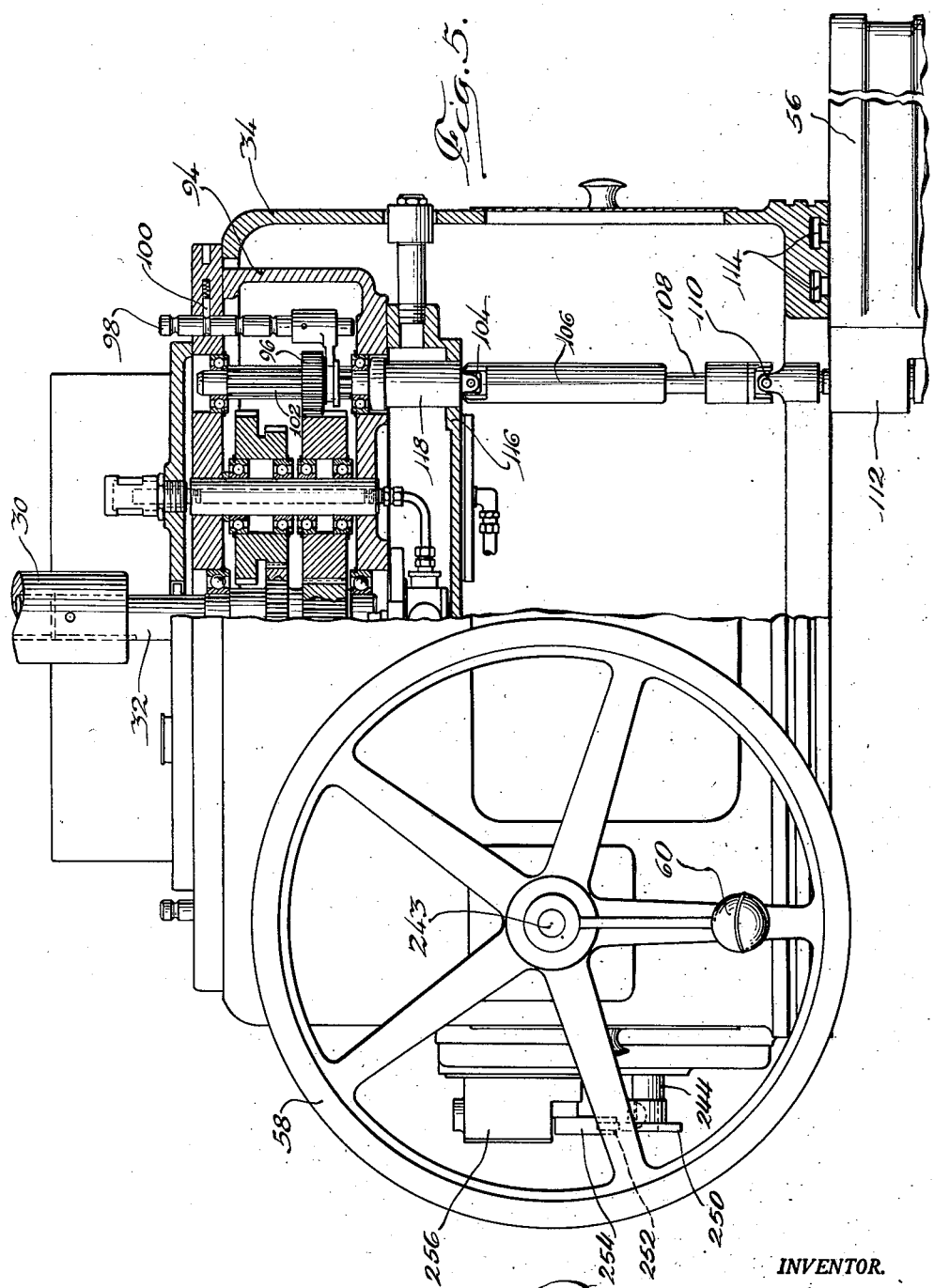

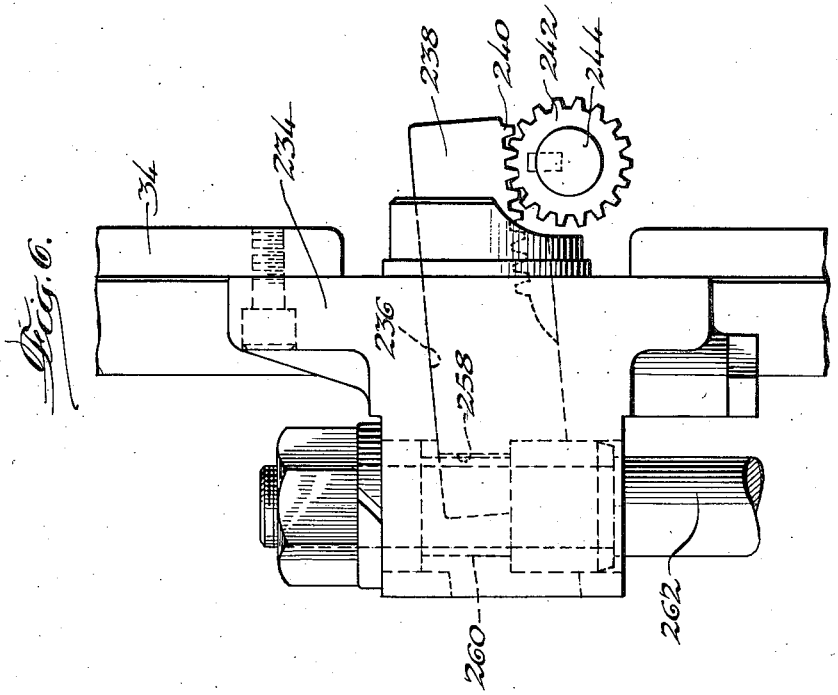
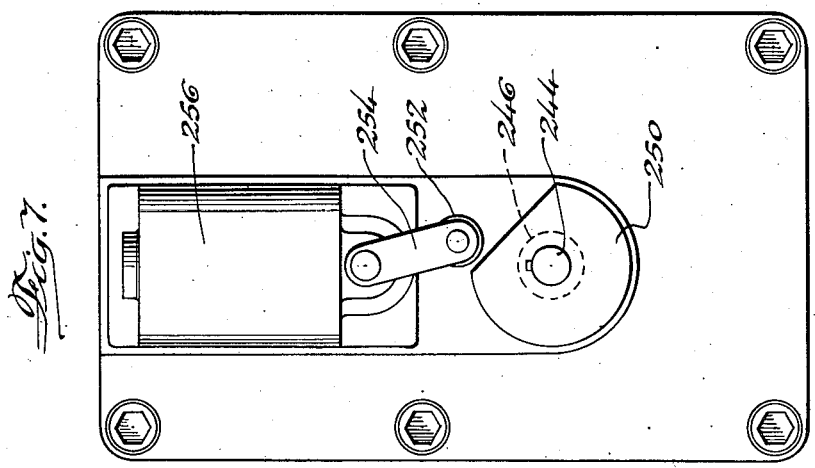

Oct. 4, 1949.  R. A. SCHAFER  2,483,712
MACHINE TOOL
Filed May 4, 1945  14 Sheets-Sheet 7
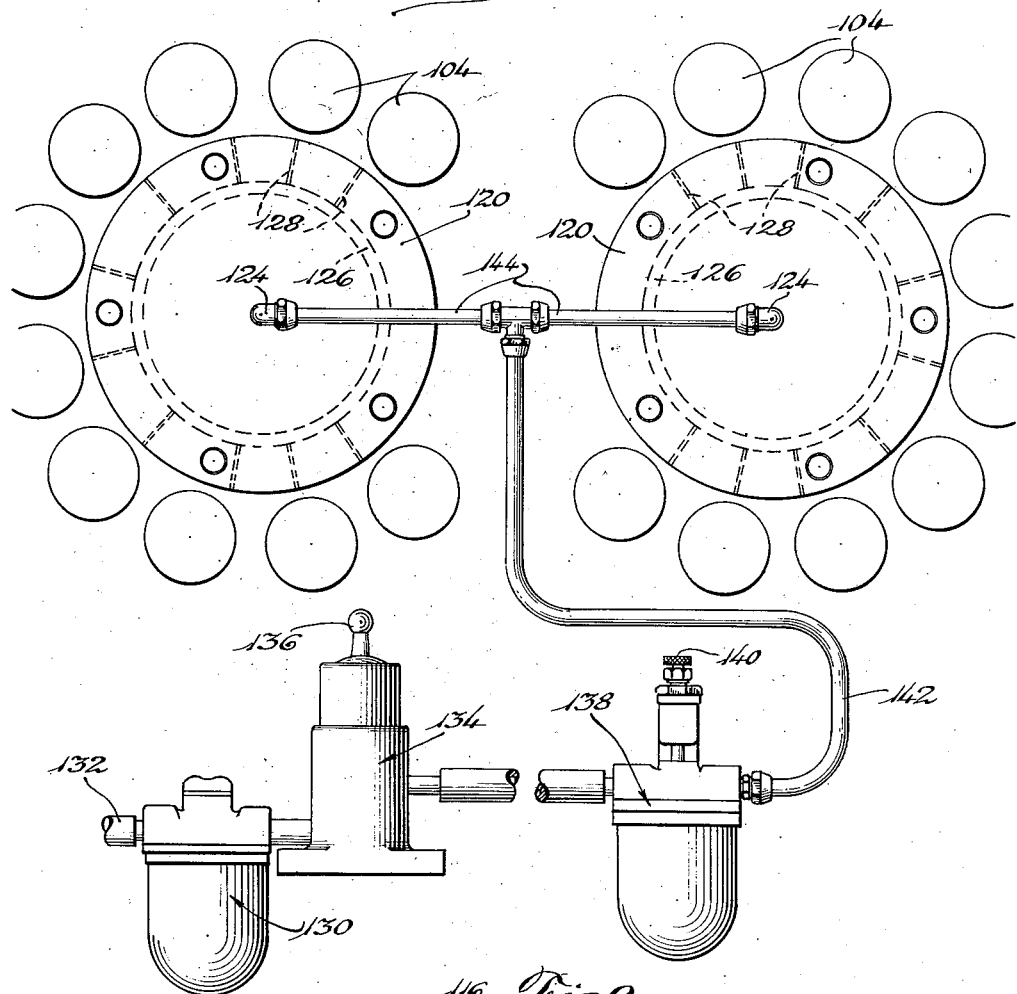
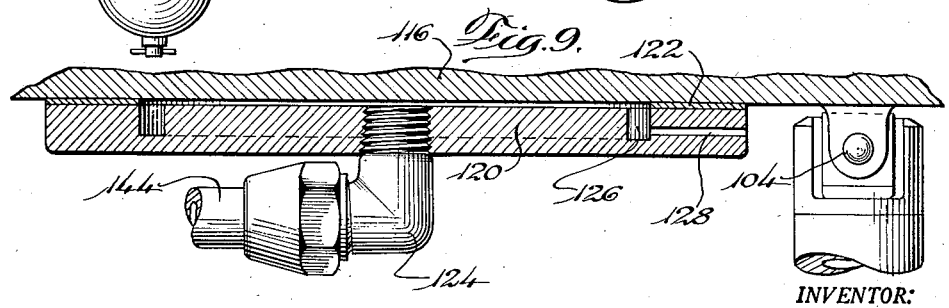
INVENTOR:
Robert A. Schafer
By Williams, Bradbury & Hinkle
Attorneys.

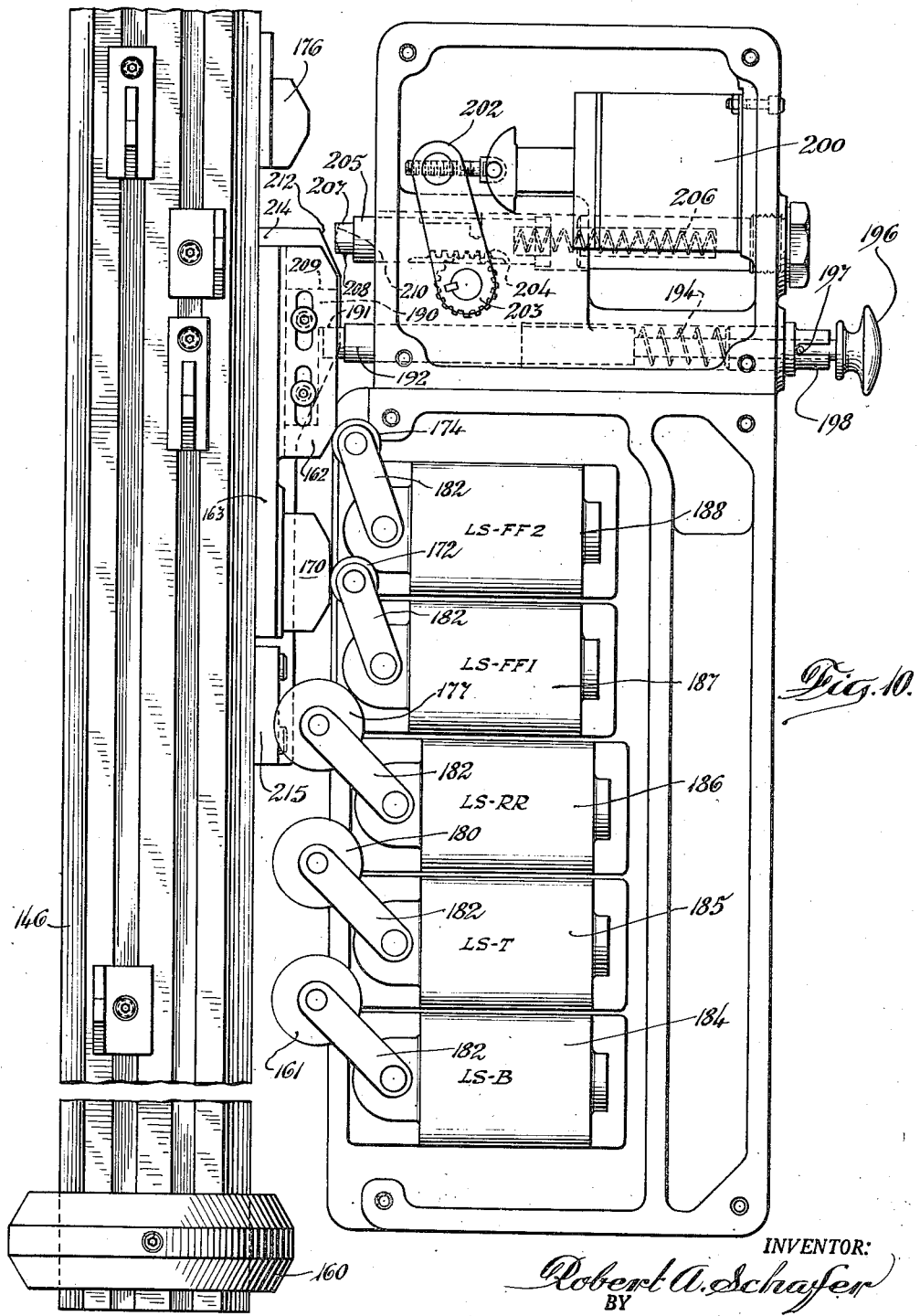

Oct. 4, 1949. R. A. SCHAFER 2,483,712
MACHINE TOOL
Filed May 4, 1945 14 Sheets-Sheet 9
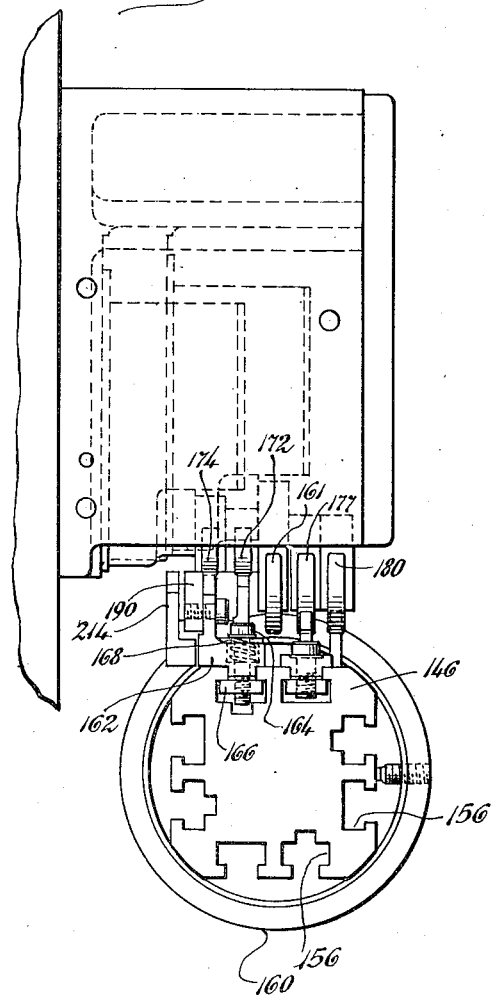
Inventor:
Robert A. Schafer
By Williams, Bradbury & Hinkle
Attorneys Oct. 4, 1949.　　　R. A. SCHAFER　　　2,483,712
MACHINE TOOL
Filed May 4, 1945　　　　　　　　　　14 Sheets-Sheet 10
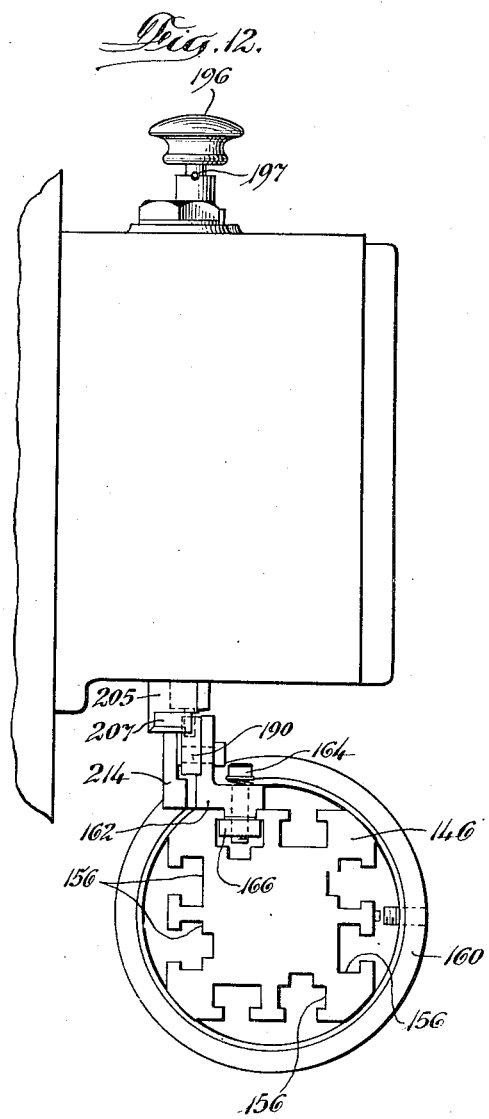
INVENTOR.
Robert A. Schafer
BY Williams, Bradbury & Hinkle
Attorneys.

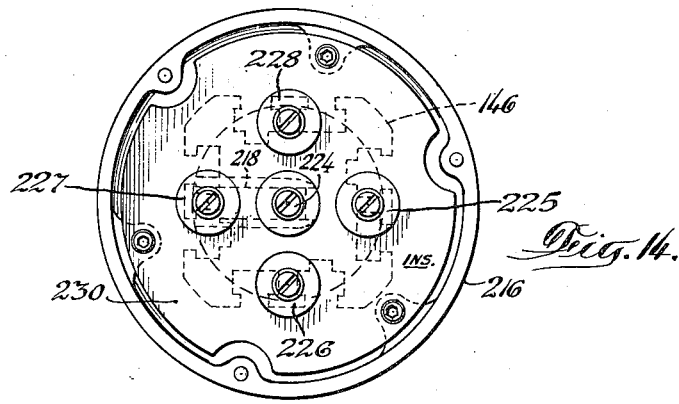
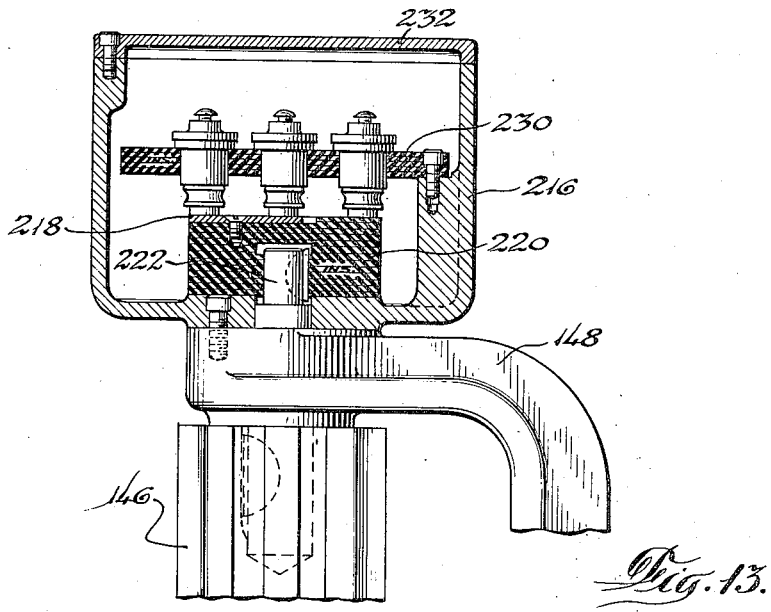

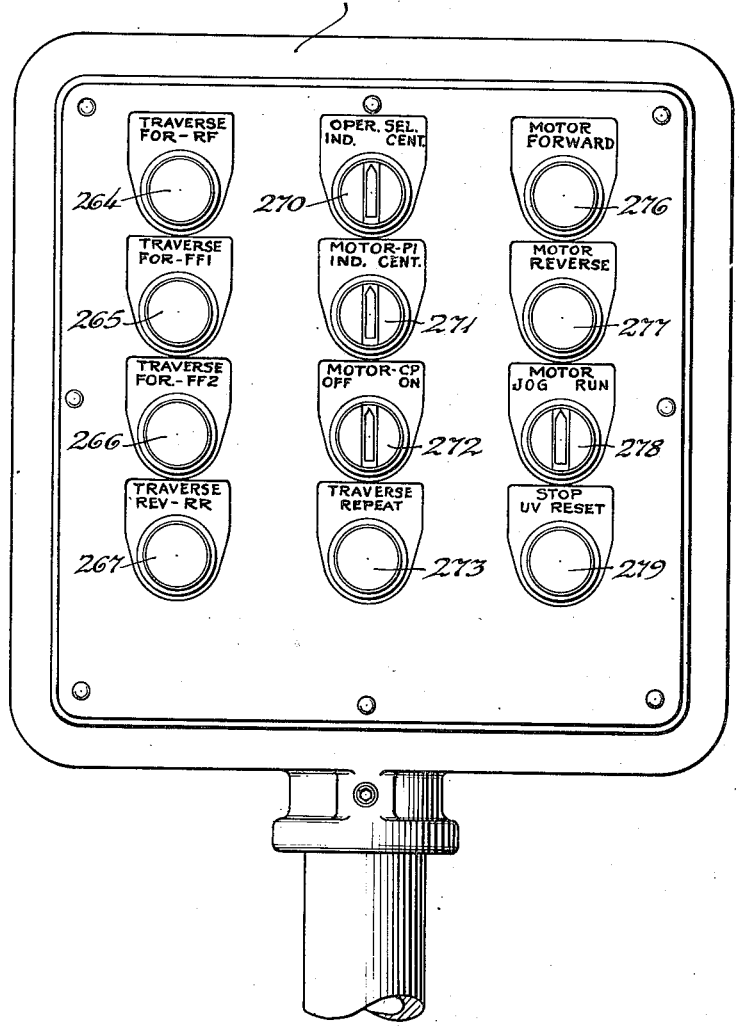

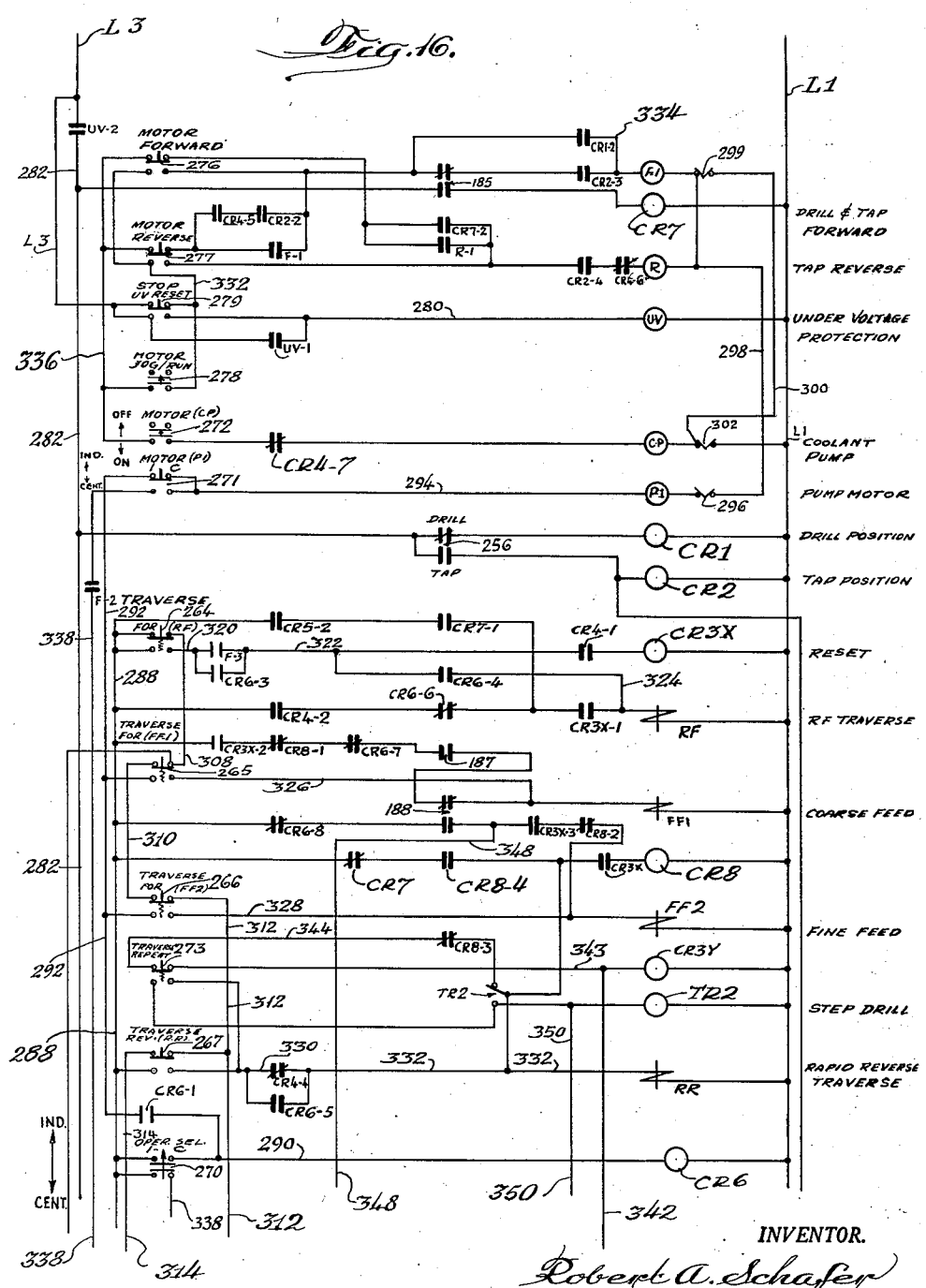

Patented Oct. 4, 1949

2,483,712

UNITED STATES PATENT OFFICE 2,483,712

MACHINE TOOL

Robert A. Schafer, Richmond, Ind., assignor to National Automatic Tool Company, Inc., Richmond, Ind., a corporation of Indiana Application May 4, 1945, Serial No. 591,961

3 Claims. (Cl. 77—32)

My invention relates generally to machine tools, and more particularly to improvements in automatic machine tools for performing drilling, step-drilling, tapping, and similar operations.

In the use of automatic machine tools in which the character of the automatic cycle to be performed is controlled by adjustably positioned cams, it is frequently necessary, due to changes in the workpieces or the character of the operations to be performed thereon, to reset the adjustable control cams and thereby to condition the machine for the performance of any one of two, three, or four different automatic cycles. In other instances, it may be desirable, when the machine is equipped with but a single spindle, to change the tools in the spindle for performing a series of various operations on a single hole, such, for example, as a drill, ream, throat, or face. In the past, this has required the laborious resetting of the cams each time the character of the automatic cycle was to be changed.

It is thus one of the objects of the present invention to provide improved means whereby such changes in the control cam settings are unnecessary. Instead, the operator may by a simple indexing operation, select any one of a plurality of preset groups of cams for controlling the machine for the performance of the desired automatic cycle, and incidental thereto make any necessary changes in the electrical control circuits.

Another object is to provide improved controls, mechanical and electrical, for causing the machine to perform step-drilling operations, whereby the chips are cleared from the drill automatically at predetermined intervals, to make possible accurate and rapid drilling of deep holes with a minimum of tool trouble.

In multiple spindle machine tools employing spaced universal joints in their drive shafts, considerable difficulty has been experienced in securing adequate lubrication of the upper universal joints. Various attempts to solve this problem by providing oil holes leading to the bearings, or by the simple lubrication with an oil can, have in general been found to be unsatisfactory, and these joints therefore frequently burned out due to lack of adequate lubrication. It is thus a further object of my invention to provide an improved means for supplying adequate lubrication to the upper universal joint bearings of adjustable multiple spindle machine tools.

It is a further object of the invention to provide an improved machine tool having preset cam controls for effecting automatic cycles of the machine, together with manual remote control switches at the operator's station, which may be utilized to control the cycle manually from the operator's position, irrespective of the phase of the cycle in which the machine happens to be at the moment.

A further object is to provide an improved manual remote control apparatus for the operation of a machine tool in which all of the manually operable controls are so arranged that the operator must maintain one of the controls operated against spring pressure, so that when such control is released the machine immediately stops.

A further object is to provide an automatic machine tool for the performance of drilling, step-drilling, tapping, and similar operations, with an improved electrical control system whereby these operations may be expeditiously performed, requiring but a minimum of attention on the part of the operator.

Other objects will appear from the following description, reference being had to the accompanying drawings, in which:

Fig. 3 is a vertical sectional view of the neck portion of the tool, taken substantially along the line 3—3 of Fig. 2;

Fig. 4 is a fragmentary elevational view of the spindle speed shifting control means;

Fig. 5 is a fragmentary sectional view of the head, showing particularly the speed change gearing for driving the spindles, and showing a portion of the lubricating system for the spindle drive shafts and the upper universal joints of the spindles;

Fig. 6 is a fragmentary elevational view showing the means for providing a driving connection between the head and the hydraulic motor for elevating and lowering the head;

Fig. 7 is an elevational view of the interlocking limit switch and the cam for operating the latter;

Fig. 8 is a schematic diagram illustrating the upper joint lubricating system;

Fig. 9 is a vertical sectional view of one of the upper joint lubricator manifolds;

Fig. 10 is a side elevational view of the cam bracket and the various limit switches operated by the cams mounted on the bracket, including the controls for step-drilling operation;

Fig. 11 is a plan view of the cam bracket and limit switch assembly, with the step-drilling attachment removed;

Fig. 12 is a plan view of the step-drilling attachment showing its relationship with the cam bracket and cams carried thereby;

Fig. 13 is a side elevational view, a portion thereof being in section, showing the cam bracket and rotary cam position switch;

Fig. 14 is a plan view of the rotary cam position switch, shown in Fig. 13, with the cover plate removed;

Fig. 15 is a front elevational view of the push button control panel; and

Figure 16A:
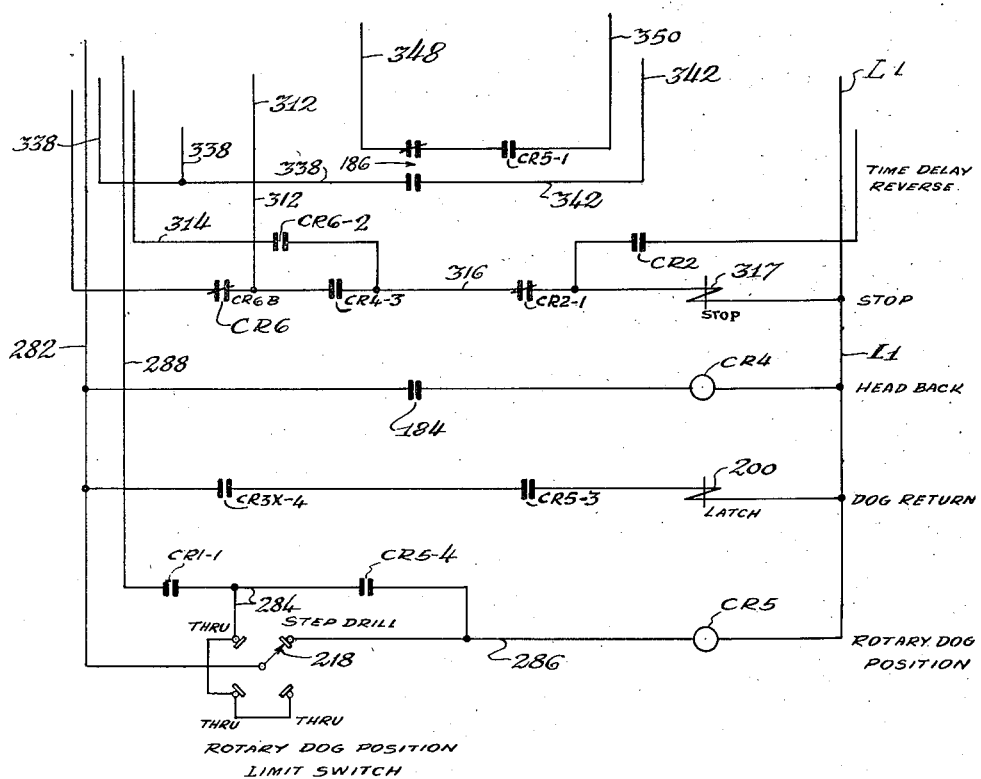

Figs. 16 and 16a together, constitute a schematic wiring diagram of the electrical control circuits for the machine.

*General description*

The invention is illustrated herein as applied to a multiple spindle machine tool for performing drilling, reaming, tapping, and similar operations.

Figure 1:
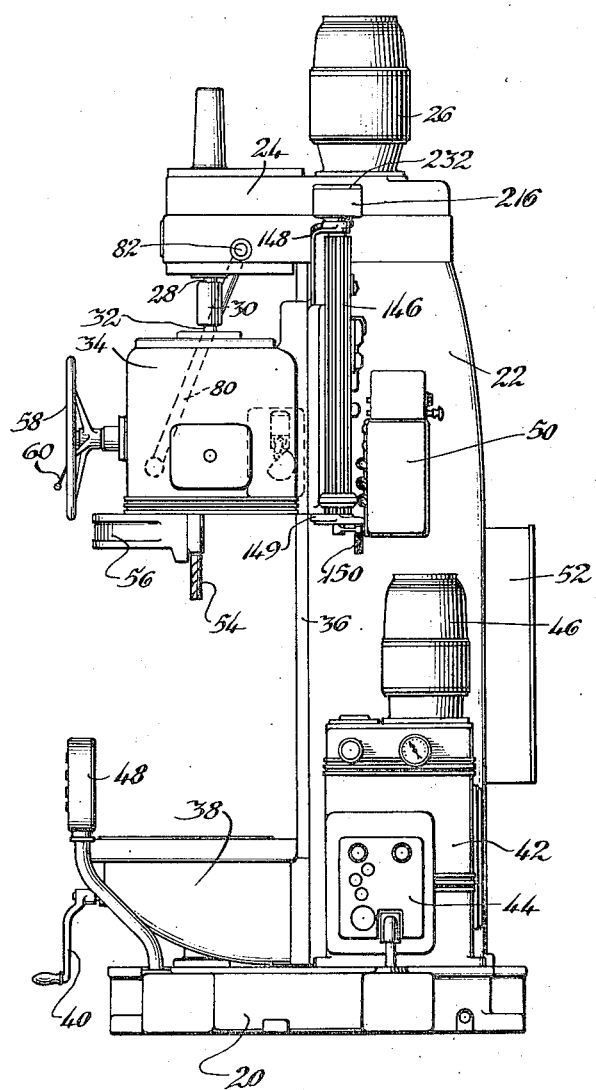
Fig. 1 is a side elevation of the machine showing the general arrangement of the various parts thereof.
Figure 2:
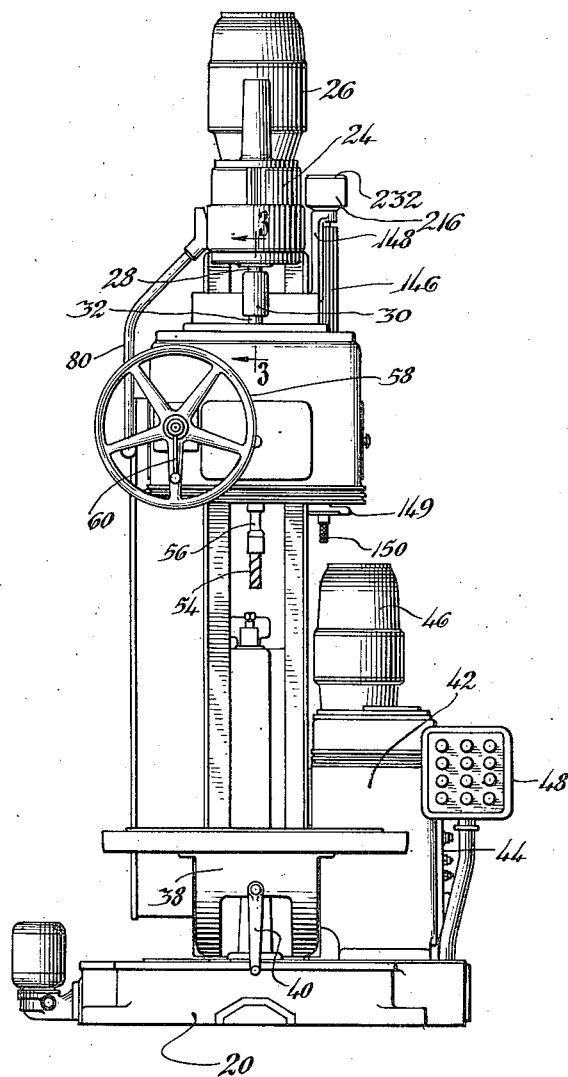
Fig. 2 is a front elevation of the machine tool.

In Figs. 1 and 2, the machine is illustrated as comprising a base 20 having a hollow cast iron column 22 to which a neck structure 24 is secured. A spindle drive motor 26 drives a splined shaft 28 through suitable gearing contained within the neck structure 24. The splined shaft 28 is connected through a coupling 30 with a main drive shaft 32 carried in a head 34. The head 34 is mounted upon ways 36 in the usual manner, and is raised and lowered by means of the usual piston and cylinder type hydraulic actuator or motor. As will appear hereinafter, the motor cylinder is fixed to the column 22, while the piston rod extends upwardly therefrom and is detachably locked to the head 34.

A table 38 is also mounted on the ways 36, and is provided with a suitable raising and lowering mechanism manually operated by a handle 40.

The hydraulic control apparatus is mounted on an oil tank and pump housing 42 and is provided with a control panel 44, which has suitable means for adjustment of the hydraulic valves and feed rate restrictions, as shown in the copending application of Robert A. Schafer and Ralph B. Rodal, Serial No. 518,366, filed January 15, 1944, which has matured into Patent No. 2,408,957. The usual hydraulic pumps are driven by a motor 46.

The hydraulic control valves mounted in the panel 44 are in part controlled by solenoids, which may be manually controlled from a push button panel 48, or may be automatically controlled by limit switches contained in a limit switch casing 50, as well as by other relays contained in a relay panel housing 52.

Within the head 34 is the gearing for driving a plurality (only one shown) of tool carrying spindles 54 which may be adjustably positioned by means of spindle support arms 56. Also mounted on the head 34 is a hand wheel 58 and control handle 60, the latter being provided to render the hand wheel operative to raise and lower the head 34 for manually controlled tapping operations, as will appear more fully hereinafter.

*Neck structure and gearing*

As best shown in Fig. 3, the motor 26 has a drive shaft 62 keyed to a shaft 64, the latter having a drive pinion 66 formed thereon. The pinion 66 drives the splined shaft 28 through a suitable train of speed reducing gearing, which includes a shiftable cluster gear 68 mounted for sliding movement on a splined shaft 70. The gear 72 of the cluster 68 is adapted, when the latter is moved upwardly, to mesh with a pinion 74, while when it is in the lower position shown, the pinion 76 of the cluster 68 meshes with a gear 78 turning with the pinion 74. Thus when the cluster 68 is in its lowermost position shown, the splined shaft 28 is driven at high speed, whereas when it is in its uppermost position with the gear 72 in mesh with the pinion 74, the splined shaft 28 is driven at low speed.

The shifting of the cluster gear 68 is effected by manual operation of a shift lever 80 (Fig. 4), nonrotatably secured to a shaft 82, and having a pointer 84 to indicate its position, the pointer being cooperable with suitable indicia "H", "N", and "L", representing high speed, neutral, and low speed.

Rigidly secured to the shaft 82 is a segment gear 86 which meshes with a rack 88 slidable on a shaft 90, the rack having formed integrally therewith a yoke 92 (Fig. 3) encompassing the cluster gear 68.

*Gear chest and adjustable head*

As best shown in Fig. 5, the casting comprising the head 34 has removably secured therein a gear chest 94. Within the gear chest are a plurality of trains of gearing driven from the central drive shaft 32, each gear train terminating in a shiftable pinion 96 adjustable in a vertical direction by means of grooved shifter shafts 98 which are held in adjusted position by spring pressed detents 100. The pinions 96 are mounted on splined shafts 102 which terminate in upper universal joints 104, the latter being connected by a hollow splined sleeve 106 and a splined shaft 108 slidable in the sleeve 106. The sliding shaft 108 has a lower universal joint 110 secured thereto to connect the sliding shaft 108 to the tool carrying spindle 112.

The tool carrying spindles 112 may be adjustably positioned in the usual manner, as by arms 56 (Fig. 1) which are secured to the head 34 by bolts having their heads located in T slots 114 (Fig. 5).

As previously mentioned, considerable difficulty has been experienced in the lubrication of the upper universal joints 104. It will be understood that in a multiple spindle drilling machine there may be as many as fifty spindles, and thus fifty universal joints 104 requiring lubrication.

For lubrication of these joints, there is provided an oil pan 116 (Fig. 5) secured to the bottom of the gear chest 94. This oil pan has suitable openings for the lower ends of the shafts 102, oil being prevented from leaking through these openings around the shaft by means of sleeves 118 which are pressed into the oil pan 116. Suitably secured to the lower surface of the oil pan 116 is an oil distributor plate 120, an oiltight seal being effected between this plate and the oil pan 116 by a gasket 122 (Fig. 9), this gasket also spacing the plate 120 sufficiently from the lower surface of the oil pan 116 to provide a space for the flow of a lubricant mist from a central supply elbow 124 to an annular groove 126 formed in the upper surface of the plate 120. Leading radially from the annular groove 126 are a plurality of jet passageways 128 which are directed respectively toward upper universal joints 104.

As best shown in Fig. 8, the oil mist is provided by an apparatus comprising an air filter 130 which is connected to a suitable source of air under pressure by a pipe 132, and separates foreign particles and water from the air. The flow of the air from the air filter 138 is controlled by a valve 134 manually operated by handle 136, the air flowing from the valve 134 to an atomizing device 138, the rate at which the oil is atomized by the air being adjustably controlled by a needle valve 140. The atomized oil flows from the device 138 through a conduit 142 and branch conduits 144 to the elbows 124 secured in the oil mist distributing plates 120. In Fig. 6 it will be noted that there are two of these plates, and that a plurality of upper universal joints 104 are diagrammatically indicated by circles arranged concentrically around the plates.

In this system of lubrication, it is essential that the velocity of the flow of the oil mist be maintained high so as to prevent separation of the oil from the air. By maintaining the velocity high, the mixture of oil and air retains its homogeneity and as a result the distribution of oil to the various universal joints is uniform.

By this method and means for the lubrication of the upper universal joints, a very minute quantity of lubricating oil is supplied to each of the joints every time the valve 134 is opened, and the oil being in very finely divided particles, is carried by the air to all surfaces of the universal joint and thus supplies a minute, but adequate, quantity of lubricant to the bearing surfaces thereof. It is essential, when the machine tool is being used on certain kinds of workpieces, that no oil drip from the spindles on to the workpieces. By this method of periodic lubrication, using a fine oil mist, it has been found practical to lubricate the joints adequately without supplying a surplus of oil, which might drip upon the workpieces.

The lower universal joints 110, as well as the bearings in the arms 56, are accessible for hand lubrication by means of a suitable oiling device. The oil reservoir of the atomizing device 138 need not be very large, because of the small amount of oil which is used by this method of lubrication, and also by virtue of this fact the oil mist does not appear to collect to an undesirable extent upon the inner walls of the head 34.

*Cam bracket assembly*

As above stated, it is frequently desirable rapidly to convert the machine for performance of one of a plurality of different automatic cycles. In the machine illustrated, particularly in Figs. 10 to 14, there is disclosed an apparatus whereby four sets of control cams may be preset to control four different automatic cycles, it being understood that this control mechanism might, with suitable variations, be constructed to provide more or less than four preset automatic cycles.

The apparatus comprises a T slotted cam bracket 146 which is mounted for rotation in suitable supporting arms 148 and 149 secured to the head 34. The cam bracket 146 is adapted to be rotated by means of a handle 150 having a pin 152 spring pressed to engage in one of four aligned bushed sockets 154 formed in the arm 149, the sockets 154 being spaced 90° apart.

As best shown in Figs. 11 and 12, the cam bracket 146 is provided with a plurality of longitudinal T slots 156. Suitable control cams are adjustably secured to the cam bracket 146 by bolts having their heads located in the T slots 156, depending upon the character of the operating cycle to be performed. As shown in Fig. 10, there is provided a circular stop cam 160 which is cooperable with a limit switch roller 161, irrespective of the angular position of the cam bracket 146.

A fine feed cam 162 is slidably mounted upon the cam bracket 146, the degree of friction resisting movement of the cam 162 on the cam bracket being controlled by adjustment of a screw 164 (Fig. 11) which is threaded in an elongated shoe 166 located in the T slot, the tightening of the screw 162 compressing a coil spring 168 to the extent required to provide the desired amount of friction resisting sliding movement of the cam 162. Adjustably mounted on the lower extension 163 of the cam 162 is a coarse feed cam 170 (Fig. 10), the latter being cooperable with a coarse feed roller 172. The cam 162 cooperates with a fine feed roller 174. A cam 176 is adapted to cooperate with a rapid reverse traverse roller 177. A roller 180 is provided for limiting the downward travel of the head during hand tapping operations.

In Fig. 10 the cam set-up is arranged for step drilling and therefore there is no cam shown for cooperation with this roller 180.

The rollers 161, 180, 177, 172, and 174, are rotatably mounted on pivoted arms 182 and are adapted, respectively, to operate a stop limit switch 184, a tap limit switch 185, a rapid reverse limit switch 186, a coarse feed limit switch 187, and a fine feed limit switch 188.

Adjustably secured to the cam 162 is a notched block 190, the shoulder 191 of which is adapted to be engaged by the end of a plunger 192 which is normally held in the position shown in Fig. 10 by a compression coil spring 194. The end of the plunger 192 is provided with a handle 196 by which the end of the plunger may be withdrawn from the path of the shoulder 191, the plunger being adapted to be held in such outer position by a cross pin 197 which is engageable with the end of a slotted sleeve 198 through which the stem of the handle 196 is slidable. The handle 196 is withdrawn in this manner whenever the operating cycle to be performed does not include step drilling, and is released to the position in which it is shown in Fig. 10 only when the operating cycle includes step drilling.

The notched block 190 is adjusted relative to the cam 162 to determine the distance above the bottom of the hole formed by the preceding drilling operation—at which the fine feed shall commence. In other words, it is necessary to provide a certain clearance at which the fine feed commences, since it is practically impossible to position the cams so that the coarse feed will continue until the exact instant that the drill bottoms in the hole. This clearance is required because of the variable time required for the operation of the various relays, solenoids, valves, and the operation of the hydraulic system in general.

When setting up the machine for a step drilling operation, the head is moved downwardly until the cam 162 engages the roller 172 sufficiently to operate the fine feed limit switch 188. As will appear hereinafter, this switch effects changes in the hydraulic system, which cause the control valve for the hydraulic actuator to move to the fine feed position. In thus setting up the machine, the fine feed is closed off so that the coarse feed movement of the head will be stopped at the instant that the fine feed switch 180 is operated. Then the operator will adjust the position of the block 190 so that its shoulder 191 lies a predetermined distance, for example $\frac{1}{16}''$, above the end of the plunger 192. This $\frac{1}{16}''$ will represent the clearance above referred to, that is, the distance above the bottom of the hole at which the fine feed starts in the next step-drilling phase of the operating cycle.

A solenoid 200 (Fig. 10) is connected through an arm 202, pinion 203, and rack 204, to operate a retractable plunger 205 which is normally urged to the left (Fig. 10) by a compression coil spring 206. The end portion 207 of the retractable plunger 205 has a shoulder 208 which may, under certain circumstances, engage the upper edge 209 of the block 190. It also has a relieved cam surface 210 which is adapted to be engaged by the beveled cam surface 212 of the cam 214. It will be noted that the cam 214 has a downwardly extending portion 215 which is suitably bolted to the cam bracket 146.

Rigidly secured to the upper end of the arm 148 is a switch box 216 (Figs. 13 and 14). A contact plate 218 is secured to insulating material 220, and the latter is keyed to a shaft 222 which is also keyed to the cam bracket 146. A central contactor 224 and four similar contactors 225, 226, 227, and 228, are carried by a laminated insulating plate 230 fixedly secured to the switch housing 216. The housing 216 is provided with a removable cover 232. It will be noted from Fig. 14 that the contact plate 218 at all times makes contact with the central contactor 224 and one of the four contactors 225-228, depending upon the angular position to which the cam bracket 146 is moved. It will thus be seen that contact is made between the central contactor 224 and one of the contactors 225-228, depending upon the character of the operating cycle to be performed.

*Head disengaging means for manual tapping operations*

Referring to Figs. 6 and 7, a head thrust bracket 234 is rigidly secured to the head 34, and is provided with a bore 236 for the reception of a shot bolt 238. The latter is provided with a rack portion 240 meshing with a pinion 242 keyed to a shaft 244. The shaft 244 extends through a hollow shaft 246 to which the hand wheel 58 (Figs. 1 and 5) is secured. The shot bolt control handle 60 is secured at one end of a shaft 243, which is suitably geared to the shaft 244.

A cam 250 (Fig. 7) secured to the shaft 244 cooperates with a roller 252 carried by an arm 254 for operating a shot bolt limit switch 256. From Figs. 5, 6, and 7, it will be clear that when the control handle 60 is operated in one direction the shaft 244 will be rotated to move the shot bolt to the right (Fig. 6). The shot bolt is provided with a bifurcation 258 embracing a reduced diameter portion 260 of the piston rod 262 of the hydraulic actuator. Movement of the shot bolt 238 to the right (Fig. 6) thus disconnects the head 34 from the piston rod 262 so that the head may be freely elevated and lowered by rotation of the hand wheel 58. The hollow shaft 246 to which the hand wheel 58 is secured is connected by suitable gearing with a pinion engageable with a rack, the rack being secured to the vertical column 22 in the manner more fully disclosed in the patent to H. W. Bockhoff, et al., No. 2,176,414. When the control handle 60 is thus operated to disengage the shot bolt from the piston rod 262, the shot bolt limit switch 256 is operated to render the electrical automatic cycle control circuits ineffective and to permit manual traverse of the head in the performance of tapping operations, as will hereinafter appear.

*Control apparatus and the circuits*

The machine is adapted to be controlled from the push button station comprising the panel 48. This panel (Fig. 15) has twelve control switches. In the first vertical row there is a push button 264 for manual control of rapid traverse forward. This push button is spring returned and must be held depressed to maintain its switch operated. Push buttons 265, 266, and 267 operate in a similar manner, respectively, to cause forward traverse at coarse feed rate, traverse forward at the fine feed rate, and rapid reverse traverse.

In the center vertical row there are provided three selector switches 270, 271, and 272, the operation selecting switch 270 having a neutral position (as shown) and being movable counterclockwise when it is desired to use independent or manual control of the machine cycle, and turned clockwise when it is desired to have central or automatic control of the machine cycle. The switch 271 controls the operation of the pump motor 46, being turned counterclockwise for independent or manual control and clockwise for centralized or automatic control of the machine cycle. Similarly, the switch 272 controls the motor for driving the coolant pump (not shown), being turned clockwise when it is desired to supply coolant to the tools and work.

A spring returned push button 273 is provided for "traverse repeat" and its operation results in a reverse (upward) movement of the head for a distance sufficient to permit the removal of the chips, and immediately thereafter causes downward rapid forward traverse of the head to the position at which the drills again engage the work, whereupon the head moves downwardly at the adjusted fine feed rate. This push button is utilized only in step-drilling operations when for one reason or another the drills are not cutting properly.

A push button 276 is provided to start the head motor 26 in a forward direction. A similar push button 277 is provided for starting the head motor 26 in a reverse direction, this push button also being effective to stop forward rotation of the motor 26. A three-position switch 278 is adapted to be moved clockwise from its neutral position to its "run" position whenever it is desired to cause the machine to operate more or less continuously. It is moved counterclockwise to its "jog" position when it is desired to run the head motor 26 for short intervals, as in setting up for tapping operations. When this switch is in the latter position, the head motor 26 will operate in the forward or reverse direction only as long as either the push button 276 or 277 is held depressed. A push button 279 is provided for resetting the under voltage release relay, which latter is provided to render the controls inoperative whenever the line voltage drops below a safe operating voltage.

As more fully shown in the copending application of R. A. Schafer and Ralph Rodal, Serial No. 518,366, filed January 15, 1944, now U. S. Patent Number 2,408,957 dated October 8, 1946 the hydraulic controls for determining the direction of operation of the main hydraulic actuator which raises and lowers the head as well as determining the speed of operation thereof, is controlled by a plurality of solenoids. These solenoids are shown in the wiring diagrams, Figs. 16 and 16a, as solenoids RF, which cause rapid forward traverse of the head; solenoid FF1 which causes forward coarse feed of the head; solenoid FF2, which causes the hydraulic control to effect fine or slow feed of the head in the forward direction, solenoid RR which, through the hydraulic valves and controls, causes rapid reverse traverse of the head; solenoid marked "Stop", which through the hydraulic control valves relieves the pressure at both ends of the cylinder of the hydraulic actuator so that the head comes to a stop.

Referring to Figs. 16 and 16a, the main lines for supplying energizing current for the electrical controls comprise lines L1 and L3. In the performance of a manual control cycle (for example, in setting up the machine for the performance of a drilling cycle) of the machine the operator first presses push button 279, thereby completing a circuit through the lower contacts of this switch and conductor 280 through under voltage relay coil UV to line L1. Energization of the relay UV results in closure of switch UV-1, which establishes a holding circuit for the winding UV. Energization of this relay UV also results in closure of switch UV-2, which supplies power to the control circuits through conductor 282.

When it is desired to perform a manual drilling cycle, switch 270 is moved to "Ind." position. It is assumed that under these circumstances the shot bolt 238 is in engagement with the groove in the piston rod 262 so that the head is locked to the hydraulic actuator, and also that the switch 256 (Figs. 7 and 16) is in drilling position and thus energizes control relay CR-1, which, through the operation of a plurality of switches hereinafter to be described, sets up the controls for a drilling cycle. Under the assumed conditions, the rotary contactor 218 (Fig. 16a) associated with the cam bracket 146 will complete a circuit from the conductor 282 to a conductor 284, and thus there is no direct connection between conductor 282 and conductor 286. (In Fig. 16a, the contactor 218 is shown in step-drilling position. If the conductor 282 were connected to conductor 286 by the contactor 218, a control relay CR5 would be energized and this would condition the machine for step-drilling operation.) Since the relay CR1 was previously energized, its switch CR1-1 is closed, and current is therefore supplied from the conductor 284 to a conductor 288.

The supply of current to the conductor 288 results in energization of relay CR6, since the switch 270 is in independent position and thus completing a circuit from conductor 288 to conductor 290. As soon as relay CR6 is energized, contacts CR6-1 are closed, thereby completing a circuit from conductor 290 to conductor 292 through switch 271 (in independent position) to conductor 294, thereby energizing the pump motor starter P1 through an overload relay 296, which through conductor 298 is in series with a second overload relay 299 and by way of a conductor 300 with a third overload relay 302, the latter overload relay being connected between conductor 300 and line L1. The motor starter P1 upon energization supplies current to the pump motor 46, and thus oil is supplied under pressure for the operation of the hydraulic controls.

When the electrical controls of the push button station are in the positions previously assumed, and the pump motor starter P1 energized, the hydraulic control valve which determines the direction and speed of movement of the hydraulic actuator is in stop position, due to the energization of the stop solenoid. The circuit for energizing this solenoid may be traced as follows: from conductor 288, through normally closed contacts of switch 264, conductor 308, normally closed contacts of switch 265, conductor 310, normally closed contacts of switch 266, conductor 312, through normally closed contacts of switch 267, through conductor 314, through closed contacts CR6-2, conductor 316, through normally closed contacts CR2-1, and through stop solenoid 317 to line L1. It will be clear that operation of any of the switches 264, 265, 266, or 267 will result in denergization of the stop solenoid 317.

The head is thus in stopped position and any desired movement thereof may be effected by operation of suitable control switches 264 to 267. Assuming that it is desired to move the head in rapid forward traverse, the operator will press push button 264, thereby breaking the previously described circuit which energized the stop solenoid 317, and completing a circuit from conductor 288 through conductor 320, closed contacts CR6-3, conductor 322, through closed contacts CR6-4, conductor 324, through the RF solenoid, to L1. This moves the control valve to the rapid forward position and the head will move in rapid forward traverse as long as the push button 264 is held depressed. As soon as the operator releases the push button 264, the stop solenoid 317 is again energized and the directional valve moved to stop position, thus stopping the movement of the head, and opening the previously described circuit which energized the solenoid RF. The operator may then position the coarse feed cam 170 (Fig. 10) so that the latter may operate its limit switch 187 at the proper head position during an automatic cycle.

Assuming that the operator then desires to move the head forward slowly to bring the drills in position for engagement with the work, he will depress push button 265, thereby opening the previously described circuit for the energization of the stop solenoid 317, and completing a circuit from the conductor 292 through conductor 326, and the coarse feed solenoid FF-1 to the return line L1. As long as the push button 265 is thus held depressed, the head will move slowly downwardly at a speed determined by the coarse feed adjustable aperture valve and upon release of the push button the solenoid FF1 will be deenergized, and the stop solenoid reenergized.

At this time the operator may adjust the position of the cam on the cam bracket 246, which determines when fine feed shall commence.

For producing fine forward feed of the head, the push button 266 is depressed, thereby opening the previously described circuit through which the stop solenoid was energized, and completing a circuit from conductor 292 through conductor 328 and solenoid FF2, the latter moving the hydraulic controls to positions to cause fine (slow) forward feed of the head. The operator may hold the push button 266 depressed until the head has moved the desired distance, and may then set the reverse cam 176 on the cam bracket 146.

To cause rapid reverse traverse of the head, the operator depresses push button 267, thereby opening the previously described energizing circuit for the stop solenoid 137 and completing a circuit from conductor 288, through conductor 330, closed contact CR6-5, conductor 332, and solenoid RR, to line L1. The hydraulic controls will be operated by solenoid RR to effect rapid reverse traverse and such movement of the head will continue until the tools clear the work and the push button 267 is released. The stop cam 160, if desired, may then be positioned, although ordinarily the stop cam will not be positioned to permit complete reverse traverse of the head.

From the foregoing it will be clear that the operator has full manual control of the machine and may thus readily position the control cams for the performance of any particular automatic cycle.

Assuming that the cams have thus been set for an automatic cycle and that the stop cam 160 is in contact with the roller 161, the machine is in condition to start an automatic cycle. To initiate such cycle, the operator moves the switches 270, 271 to "Cent." position, the switch 272 to "On" position, and the switch 278 to "Run" position.

A conductor 332 is connected through switch 279 to the line conductor L3 so that when the operator depresses push button 276 the normally open contacts of this switch are closed so that current is supplied to conductor 334 through relay contact CR1-2 to the forward starting contactor F of the motor 26, the circuit being completed to the line L1 through the overload relays 299, 302. Depression of the push button 276 also establishes a holding circuit for the forward starting contactor F through switch F1 and normally closed contacts of push button switch 277 to conductor 336, which connects with line conductor L3 through the contacts of push button switches 278, 279. The motor 26 will thereafter continue running normally until it is stopped manually or by the operation of a protective device.

A circuit through the starting contactors P1 for the hydraulic pump motor 46 is completed when the contacts F2 are closed, due to the energization of forward contactors F. This circuit is traced as follows: from line L3, through normally closed contacts UV2, conductor 282, rotary contactor 218, conductor 284, relay contact CR1-1, conductor 288, through lower switch contacts of selector switch 270, conductor 338, switch F2, lower contacts of selector switch 271, conductor 294, starter contactors P1, through overload relay 296, conductor 298, overload relay 299, conductor 300, and overload relay 302, to L1.

Since the switch 184 (Fig. 16a) is closed by the stop cam 160 (Fig. 10), a circuit will be completed from conductor 282 through switch 184 and relay CR4 to line L1, energizing this relay.

Energization of the relay CR4 results in closing normally open switch CR4-1. Thus upon depression of the push button 264 to initiate the automatic cycle, the relay CR3X is energized through a circuit from conductor 288 through lower contacts of switch 264, conductor 320, closed contacts F3, conductor 322, contacts CR4-1, and relay CR3X to line L1. The relay CR3X is a latching relay which remains latched until winding CR3Y is energized.

When relay CR3X is energized, a circuit through the rapid forward solenoid RF is completed, this circuit being traced as follows: from conductor 288, through switch contact CR4-2, normally closed contacts CR6-6, contacts CR3X-1, and solenoid RF to line L1. Energization of the solenoid RF causes positioning of the hydraulic controls to cause rapid forward traverse of the head. The operator holds the push button 264 depressed until the head moves downwardly a sufficient distance to open limit switch 184. Opening this switch results in deenergization of relay CR4, which opens switch CR4-3 (Fig. 16a), thereby deenergizing the stop solenoid 317 by disconnecting the conductor 312 from the conductor 316.

The head will continue in rapid forward traverse until the coarse feed cam 170 operates its limit switch 187. When the switch 187 closes a circuit is completed through the coarse feed solenoid FF1 as follows: from conductor 288, contacts CR3X-2, contacts CR8-1, contacts CR6-7, limit switch 187, the normally closed contacts of limit switch 188, and solenoid FF1 to line L1. Energization of solenoid FF1 moves the hydraulic controls to effect coarse feed of the head.

The head continues coarse feed forward until cam 162 operates the fine feed limit switch 188. When this limit switch is operated, the normally closed contacts thereof are opened, thereby opening the previously described energizing circuit for coarse feed solenoid FF1, and at the same time closing the normally open contacts of the switch 188, thereby completing a circuit to energize the fine feed solenoid FF2 through a circuit traced as follows: from conductor 288, through contact CR6-8, normally open contacts of limit switch 188, contacts CR3X-3, normally closed contacts CR8-2, and solenoid FF2, to line L1. The energization of solenoid FF2 conditions the hydraulic controls to cause fine (slow) feed forward.

Such fine feed of the tools into the work continues until cam 176 engages the roller 177 and operates the rapid reverse limit switch 186 (Fig. 16a). Closure of the normally open contacts of limit switch 186 completes a circuit from conductor 288 through the lower contacts of switch 270, conductor 338, normally open contacts of limit switch 186, conductors 342 and 343, and unlatching relay CR3Y to line L1. Energization of the latter winding results in releasing the mechanically held relay CR3X.

Release of CR3X results in opening switch CR3X-3 and thus opens the previously described energizing circuit for fine feed solenoid FF2. Simultaneous with the energization of relay CR3Y current from the conductor 342 flows through the normally closed contacts of push button switch 273, conductor 344, normally closed contact CR8-3, normally closed contacts of time relay TR2, conductor 332, and rapid reverse solenoid RR, to line L1. Energization of solenoid RR, through the hydraulic control apparatus, causes the head to move upwardly in rapid reverse traverse. After the head has moved upwardly a short distance, the limit switch 186 is operated, returning to normal condition, thus deenergizing both the last described circuit and the circuit through CR3Y. The head continues its rapid reverse traverse until the stop dog 160 operates limit switch 184 (Figs. 10 and 16a), closing the switch and completing a circuit from conductor 282 through this switch and CR4 to line L1. Energization of CR4 results in closure of switch contacts CR4-3, completing a circuit through the stop relay 317, this circuit being traced as follows: from conductor 288, through upper switch contacts of push button 264, conductor 308, upper contacts of push button switch 265, conductor 310, upper contacts of push button switch 266, conductor 312, contacts CR4-3, conductor 316, contacts CR2-1, and stop solenoid 317, to line L1. Thus a complete operating cycle is completed, and the head will come to rest.

A second operating cycle is started only by depression of the push button 264.

If for any reason the operator should desire to interrupt the automatic cycle at any time, this may be accomplished by depression of the push button 267. It will be noted that depression of this push botton 267 completes circuits through the rapid reverse solenoid RR and the latch release coil CR3Y. The circuit through the solenoid RR may be traced from the conductor 288 through the lower switch contacts of push button 267, normally closed contacts CR4—4, conductor 332, winding RR, to line L1. Similarly, a branch circuit is completed from the conductor 332 through the normally closed contacts of time relay TR2, switch contacts CR8–3, conductor 344, upper contacts of push button 273, conductor 343, and CR3Y, to line L1. Under these conditions the head will therefore return to its upper limit position in the same manner as previously described for the rapid reverse traverse portion of the automatic cycle.

*Step-drilling operation*

In the performance of an automatic step-drilling cycle, the operations of the control circuits and apparatus are generally similar to those above described, with the following additional functions taking place.

When an automatic step-drilling operation is to be performed, the cam bracket 146 is turned to the position in which it is shown in Fig. 10, and thereby causes contactor 218 to complete a circuit from conductor 282 to conductor 286 to energize CR5. Energization of CR5 results in setting up the necessary control circuits for step-drilling operation. Assuming that all motors have been started in the manner previously described, the automatic step-drilling cycle is initiated by depressing the rapid forward push button 264. This causes energization of CR3X and thus the energization of the RF solenoid to cause rapid forward traverse of the head, as previously described. The head moves forward until the cam 170 operates limit switch 187 to energize coarse feed solenoid FF1, and thereby causes the head to feed rapidly downwardly for a short distance until the cam 162 operates the fine feed limit switch 188. It will be recalled that the cams 170 and 162 are slidable relative to the cam bracket 146.

In conditioning the machine for a step drilling operation, the plunger 192 is permitted to move inwardly to the position in which it is shown in Fig. 10, so that its extremity will be in line with the shoulder 191 of the stop plate 190. Closure of the normally open contacts of switch 188 completes a circuit through the fine feed solenoid FF2, as previously described, whereupon the hydraulic control apparatus will cause the head to move forward at the desired low feed rate. Upon such operation of the limit switch 188, a circuit is also completed to energize time relay TR2. This circuit may be traced as follows: from conductor 288, switch contacts CR6–8, the normally open contacts of limit switch 188, conductor 348, normally closed contacts of limit switch 186 (Fig. 16a), contacts CR5–1, conductor 350, TR2, to line L1. The time relay TR2 may be of any suitable construction, but preferably comprises a relay having air dashpot control means moving slowly until the contacts are closed, and then returning rapidly when the reset circuit is operated. A predetermined time after TR2 is energized, it opens its normally closed contacts and closes its normally open contacts.

Closure of the normally open contacts of TR2 results in the completion of a circuit from conductor 350 through the then closed contacts of TR2, conductor 332, and rapid reverse RR, to line L1. It will be noted that the completion of the latter circuit does not effect energization of CR3Y and thus CR3X remains latched in energized position. The head moves in rapid reverse traverse, withdrawing the tools from the work, thus removing chips from the work and allowing the coolant to enter the hole which has been drilled. The rapid reverse traverse continues until limit switch 185 operates. When the normally open contacts of limit switch 185 are thus closed, a circuit through CR7 is completed from conductor 282 to line L1. Energization of CR7 results in closure of its contacts CR7–1 and completes a circuit from conductor 288 through CR5–2, CR7–1, CR3X–1, and rapid forward solenoid RF. The head continues rapid forward until cam 170 operates coarse feed limit switch 187, as previously described.

Following this, the fine feed limit switch 188 is operated to slow down the head to its adjusted fine feed rate. During the fine feed forward, the sliding cam 162 is pushed upwardly a distance equal to the penetration of the drill. This fine feed will commence a short distance (approximately $\tfrac{1}{16}''$) before the tool bottoms in the previously drilled hole.

The step-drilling operation of feed forward, rapid reverse, and rapid forward, is repeated continuously until the hole is drilled to the depth required. Thereupon, in the manner similar to that previously described, the rapid reverse limit switch 186 is operated to cause rapid reverse traverse of the head. Closure of the lower normally open contacts of rapid reverse limit switch 186 completes a circuit as previously described through CR3Y, thus releasing the latched relay CR3X and thereby opening contacts CR3X–1, and thus preventing reenergization of solenoid RF when the head has moved upwardly sufficiently to operate limit switch 185. The head continues in rapid reverse traverse until limit switch 184 (Figs. 10 and 16a) is operated by the stop cam 160, whereupon the head comes to rest.

It will be understood that during the step drilling cycle when CR3X is latched in operated position, its contacts CR3X–4 (Fig. 16a) are closed to complete a circuit from conductor 282 through the contacts CR3X–4 and contacts CR5–3 to the solenoid 200. It will be recalled, by reference to Fig. 10, that the energization of solenoid 200 holds the retractile plunger 205 in retracted position. However, when, as described, the CR3Y is energized to unlatch CR3X, this circuit through the solenoid 200 is opened, and the retractile plunger 205 is forced to the left (Fig. 10) by its spring 206. Therefore, during the course of the upward movement of the head in rapid reverse traverse, the shoulder 208 of the plunger 205 will engage the sliding cam assembly 163 and slide the latter downwardly relative to the cam bracket 146 to its normal lower position. Thereafter the cam 214 fixed to the cam bracket 146 will engage the end of the plunger 205 and push the latter to the right so as to permit the sliding cam 162 to pass by the retractile plunger. This leaves the sliding cam in correct position for starting the next drilling operation.

If at any time during the step-drilling cycle the reverse push button 267 is depressed, the head will be moved in rapid reverse traverse to its upper stop position and the sliding cam 163 is returned to its normal starting position.

If during the course of the step-drilling operation it appears to the operator that the drills are being overloaded, the operator may press the traverse repeat push button 273. Depression of this button has the same effect as the operation of TR2 and will cause the withdrawal of the tools from the work, after which the step drilling cycle will continue.

Tapping operation

For performing tapping operations in which the head is manually traversed and fed, suitable control circuits are provided to cause rotation of the taps and the reversal thereof. These circuits include a reversing contactor R, the jog-run selector switch 278, contacts CR1-2, contact R1, control relay CR2, and contacts CR2-2, CR2-3, CR2-4, CR4-5, and CR4-6.

By utilizing the circuits including the above mentioned circuit elements, provided particularly for tapping operation, the following operation of the machine may be obtained:

The head is moved manually forward with taps rotating in the forward direction until the taps contact the work. As the taps feed into the work, the operator moves the head forward manually at approximately the same rate until the holes are tapped to the desired depth. The tap rotation is reversed by the operation of a limit switch and the taps run reverse, thus backing out of the work. After the taps are clear of the work, the operator moves the head manually to the starting position.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In an automatic machine tool having a stationary part and a movable part, one of said parts having means for supporting the work and the other of said parts carrying tools for performing machining operations upon the work, motor means for relatively moving said parts, and means for controlling said motor means comprising: a cam bracket carried by one of said parts, a plurality of cam operated switches mounted upon the other of said parts, said cam bracket comprising a rotatable element having a plurality of faces, a plurality of longitudinally extending T slots in each of said faces, a plurality of cams adjustably secured to said bracket in said slots, manually operable means for rotating said bracket selectively to bring the cams on one of the faces thereof into cooperative relation with respect to the cam operated switches; a rotary position switch operated by rotation of said bracket; and control circuits including said cam operated switches and said rotary switch for determining the character of an automatic operating cycle to be performed by the machine.

2. In an automatic machine tool having a stationary part and a movable part, one of said parts having means for supporting the work and the other of said parts carrying tools for performing machining operations upon the work, motor means for relatively moving said parts, and means for controlling said motor means comprising: a cam bracket carried by one of said parts, a plurality of cam operated switches mounted upon the other of said parts, said cam bracket comprising a rotatable element having a plurality of faces, a plurality of longitudinally extending T slots in each of said faces, a plurality of cams adjustably secured to said bracket in said slots, manually operable means for rotating said bracket selectively to bring the cams on one of the faces thereof into cooperative relation with respect to the cam operated switches, a multi-position switch operated by rotation of the cam bracket, and control circuits including said multi-position switch and said cam operated switches for determining the character of an automatic operating cycle to be performed by the machine.

3. In an automatic machine tool of the type capable of the performance of an automatic cycle under the control of preset cams, a rotary cam bracket having a plurality of means for the reception of sets of control cams, electrical circuits including switches controlled by said cams for in part determining the character of the operating cycle to be performed, manually operable means for rotating said cam bracket to select any one of a plurality of sets of preset control cams for cooperation with said control means, means for locking said bracket in selected position, and a switch operated directly by rotation of the cam bracket and forming part of the control circuits effective as an additional factor in determining the character of the operating cycle to be performed.

ROBERT A. SCHAFER.

REFERENCES CITED

The following references are of record in the file of this patent:

UNITED STATES PATENTS

| Number | Name | Date |
|---|---|---|
| 1,874,305 | Kearney | Aug. 30, 1932 |
| 1,911,138 | Clute et al. | May 28, 1933 |
| 2,047,181 | Ferris | July 14, 1936 |
| 2,116,376 | Anderson | May 3, 1938 |
| 2,152,607 | Schmitter et al. | Mar. 28, 1939 |
| 2,324,727 | Shartle | July 20, 1943 |
| 2,359,059 | Somes | Sept. 26, 1944 |
| 2,408,957 | Schafer et al. | Oct. 8, 1946 |